(12) United States Patent
Schlisner (10) Patent No.: US 9,517,587 B2
(45) Date of Patent: Dec. 13, 2016

(54) METHOD FOR MANUFACTURE OF DRY ADHESIVE BACKED FLOORING

(71) Applicant: BASE KING, LLC, Dalton, GA (US)

(72) Inventor: Dennis G. Schlisner, Dalton, GA (US)

(73) Assignee: Base King, LLC, Dalton, GA (US)

( * ) Notice: Subject to any disclaimer, the term of this patent is extended or adjusted under 35 U.S.C. 154(b) by 733 days.

(21) Appl. No.: 13/866,329

(22) Filed: Apr. 19, 2013

(65) Prior Publication Data

US 2013/0228282 A1 Sep. 5, 2013

Related U.S. Application Data

(62) Division of application No. 12/774,955, filed on May 6, 2010.

(51) Int. Cl.

| | |
|---|---|
| *B32B 7/12* | (2006.01) |
| *B29C 63/02* | (2006.01) |
| *B32B 3/26* | (2006.01) |
| *B32B 27/30* | (2006.01) |
| *B32B 37/00* | (2006.01) |
| *B32B 38/18* | (2006.01) |
| *C09J 7/04* | (2006.01) |
| *E04F 15/16* | (2006.01) |
| *B32B 37/12* | (2006.01) |
| *B32B 38/00* | (2006.01) |

(52) U.S. Cl.
CPC .............. *B29C 63/02* (2013.01); *B32B 3/266* (2013.01); *B32B 27/30* (2013.01); *B32B 37/0015* (2013.01); *B32B 38/1841* (2013.01); *C09J 7/045* (2013.01); *E04F 15/163* (2013.01); *B32B 37/003* (2013.01); *B32B 37/12* (2013.01); *B32B 38/1875* (2013.01); *B32B 2255/10* (2013.01); *B32B 2255/26* (2013.01); *B32B 2305/38* (2013.01); *B32B 2405/00* (2013.01); *B32B 2471/00* (2013.01); *C09J 2201/128* (2013.01); *C09J 2400/263* (2013.01); *C09J 2467/006* (2013.01); *Y10T 156/10* (2015.01); *Y10T 428/2476* (2015.01); *Y10T 428/24752* (2015.01)

(58) Field of Classification Search
CPC ........... B32B 3/266; B32B 7/045; B32B 27/30
USPC ...................................... 428/343, 354, 355 R
See application file for complete search history.

(56) References Cited

U.S. PATENT DOCUMENTS

| | | |
|---|---|---|
| 1,990,701 A | 2/1935 | Knight |
| 2,303,864 A | 12/1942 | Reasor |

(Continued)

FOREIGN PATENT DOCUMENTS

| | | |
|---|---|---|
| EP | 0580009 B1 | 1/1994 |
| JP | 2000117863 A * | 4/2000 |

OTHER PUBLICATIONS

Translation of JP 2000-117863.*

(Continued)

*Primary Examiner* — Victor Chang
(74) *Attorney, Agent, or Firm* — Luedeka Neely Group, PC (57) ABSTRACT

A dry adhesive backed flooring for being installed in a flat orientation on a subfloor, the flooring including a sheet flooring material and a double-sided sheet adhesive married to the flooring material. The installed flooring is substantially free of bubbles and wrinkles and the flooring remains substantially flat as initially applied and does not significantly rise from the subfloor, bubble or otherwise detach from the subfloor under normal use conditions for the flooring.

5 Claims, 5 Drawing Sheets

(56) References Cited

U.S. PATENT DOCUMENTS

| | | | |
|---|---|---|---|
| 2,677,635 | A | 5/1954 | Urban et al. |
| 2,887,867 | A | 5/1959 | Burchenal et al. |
| 3,408,250 | A | 10/1968 | Finefrock |
| 3,475,871 | A | 11/1969 | Saunders et al. |
| 4,242,389 | A | 12/1980 | Howell |
| 4,418,120 | A | 11/1983 | Kealy et al. |
| 4,609,580 | A | 9/1986 | Rockett et al. |
| 4,730,432 | A | 3/1988 | Schafer et al. |
| 4,849,267 | A | 7/1989 | Ward et al. |
| 4,988,551 | A | 1/1991 | Zegler |
| 5,088,126 | A | 2/1992 | Mathis |
| 5,088,252 | A | 2/1992 | Antekeier |
| 5,184,445 | A | 2/1993 | Hoopengardner |
| 5,212,923 | A | 5/1993 | Pelosi et al. |
| 5,450,698 | A | 9/1995 | Hoopengardner |
| 5,553,431 | A | 9/1996 | Pelosi, Jr. et al. |
| 5,595,041 | A | 1/1997 | Hoopengardner |
| 5,971,453 | A | 10/1999 | Schlisner |
| 6,195,957 | B1 | 3/2001 | Schlisner |
| 2008/0010930 | A1 | 1/2008 | Mao |
| 2009/0223154 | A1 | 9/2009 | Anderson |
| 2010/0223872 | A1 | 9/2010 | Taylor et al. |

OTHER PUBLICATIONS

Translation of JP 2000-117863 by The McElroy Tanslation Compnay.*

Miki et al., Translation of JP 2000117863 with Certification, Publication Date Apr. 25, 2000.

* cited by examiner

METHOD FOR MANUFACTURE OF DRY ADHESIVE BACKED FLOORING

CROSS-REFERENCE TO RELATED APPLICATION

This application is a divisional of co-pending application Ser. No. 12/774,955, filed May 6, 2010, and entitled DRY ADHESIVE BACKED FLORING AND METHOD FOR MANUFACTURE, incorporated by reference herein in its entirety.

FIELD

This disclosure relates to the field of vinyl and other sheet flooring provided in rolls. More particularly, this disclosure relates to sheet flooring having pre-applied dry adhesive and to the manufacture thereof.

BACKGROUND

Currently, most vinyl, rubber and other sheet flooring products are installed to a subfloor with wet adhesives. The wet adhesives are applied to the subfloor as by use of a notched trowel. The applied adhesives are allowed to cure for a prescribed amount of time, after which the flooring material typically provided as a large roll is laid and then rolled with a weighted roller. This method can be time consuming, messy and with high moisture or high pH concrete subfloors, lead to adhesive failure. In addition, the adhesives typically have volatile organic compounds. Thus, especially when applied in a hospital setting, the area must typically be evacuated for several days and measures taken to avoid exposure of adjacent areas to the volatiles.

In addition, especially in the hospital setting in which the floor is exposed to regular movement of a heavy bed on rollers, conventional wet adhesive applied floorings tend to disadvantageously creep, buckle, and otherwise deform after relatively short periods of time. In addition, the flooring industry has been having problems with regular processed glue adhesive in high moisture areas. Various mitigation methods have been attempted, but such methods are typically of high cost and generally unsatisfactory results.

Accordingly, improvement is desired in the field of sheet flooring, and in the installation of the same, especially in hospital settings and in high moisture areas, such as coastal areas and areas having relatively high humidity levels.

The present disclosure advantageously enables the provision of rolled flooring having a sheet flooring material married to a double-sided sheet adhesive in such a manner that the resulting flooring material is substantially free of bubbles and wrinkles that would show through when the flooring material is installed on the subfloor. The disclosure also provides methods and apparatus for manufacture of the flooring, and methods for installation of the flooring.

SUMMARY

The above and other needs are met by a dry adhesive backed flooring for being installed in a flat orientation on a subfloor.

In a preferred embodiment, the flooring includes a sheet flooring material and a double-sided sheet adhesive. The sheet flooring material has a first length, a first width, a decorative upper surface, and an opposite under surface. The double-sided sheet adhesive has a second length substantially corresponding to the first length, a second width slightly less than but substantially corresponding to the first width, and first and second adhesive surfaces, the first adhesive surface being adhesively secured to the under surface of the sheet flooring.

When the flooring is installed on the subfloor by contacting the second adhesive surface to the subfloor, the installed flooring is substantially free of bubbles and wrinkles and the second adhesive surface sheet adhesive substantially permanently maintains the flooring adhered to the subfloor such that the flooring remains substantially flat as initially applied and does not significantly rise from the subfloor, bubble or otherwise detach from the subfloor under normal use conditions for the flooring.

In another aspect, the disclosure relates to a method of manufacturing a dry adhesive backed flooring for being installed in a flat orientation on a subfloor.

The method includes the steps of providing a roll of a sheet flooring material provided in a roll, the sheet flooring material having a first length, a first width, a decorative upper surface, and an opposite under surface; providing a roll of a double-sided sheet adhesive, the sheet adhesive having a second length substantially corresponding to the first length, a second width slightly less than but substantially corresponding to the first width, and first and second adhesive surfaces; and contacting the first adhesive surface to the under surface of the sheet flooring material to marry the sheet flooring material and the sheet adhesive to yield the flooring.

In yet another aspect, the disclosure relates to apparatus for marrying flooring material in a roll form with a double-sided sheet adhesive in roll form having a first exposed adhesive surface for marrying with the flooring material and a second adhesive surface covered with a release liner to yield flooring in a roll form.

In a preferred embodiment, the apparatus includes a flooring material support, a table, a flooring material position indicator, a sheet adhesive support, a sheet adhesive tensioning system, and a flooring support.

The flooring material support includes rollers for supporting a roll of the flooring material for unwinding of the roll and a computer controlled positioning system that enables lateral adjustment of the position of the roll of the flooring material.

The table includes a flat surface across which the flooring material extends during operation of the apparatus to marry the flooring material with the sheet adhesive.

The flooring material position indicator detects the location of the edge of the flooring material relative to a location on the table and provides corresponding signals to the computer controller of the positioning system for comparing the location of the edge of the flooring material to a predetermined threshold and producing a signal corresponding to the location of the edge of the flooring material. When the signal indicates a location outside of the predetermined threshold, the positioning system adjusts the position of the flooring material so that the edge thereof is returned to a location within the predetermined threshold.

The sheet adhesive support supports a roll of the sheet adhesive for unwinding of the roll. The sheet adhesive extends over the sheet adhesive tensioning system as it unrolls from the sheet adhesive support. The tensioning system is adjustable relative to the sheet adhesive support to maintain a substantially uniform and desired tension on the sheet adhesive as it is unrolled from the sheet adhesive support during the manufacture of the flooring.

The flooring support includes a power driven shaft configured to rotatably receive and snugly engage a core onto which the flooring represented by the married flooring material sheet and the sheet adhesive is rolled to provide a finished flooring material.

The apparatus functions to marry the flooring material and the sheet adhesive in such a manner that the resulting flooring material is substantially free of bubbles and wrinkles that would show through when the flooring material is installed on a subfloor.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
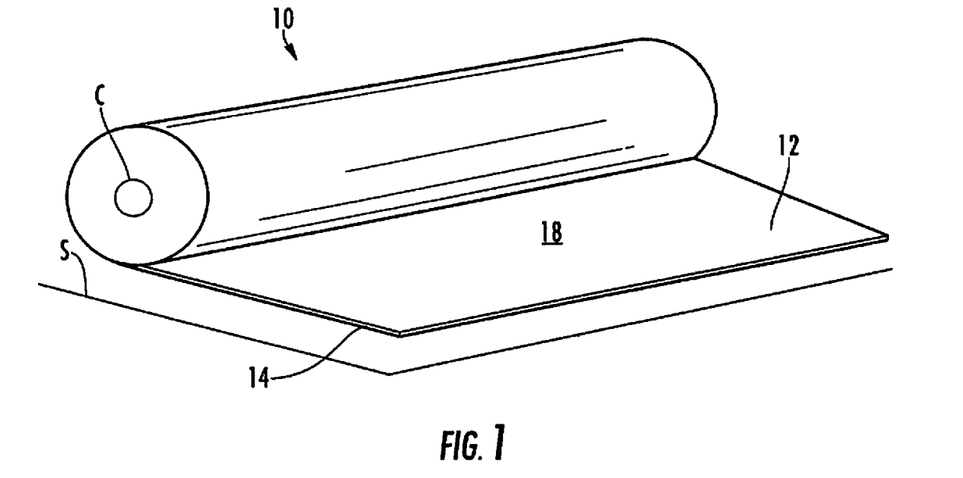
FIG. 1 is a perspective view of a roll of dry adhesive backed flooring according to the disclosure.
Figure 2:
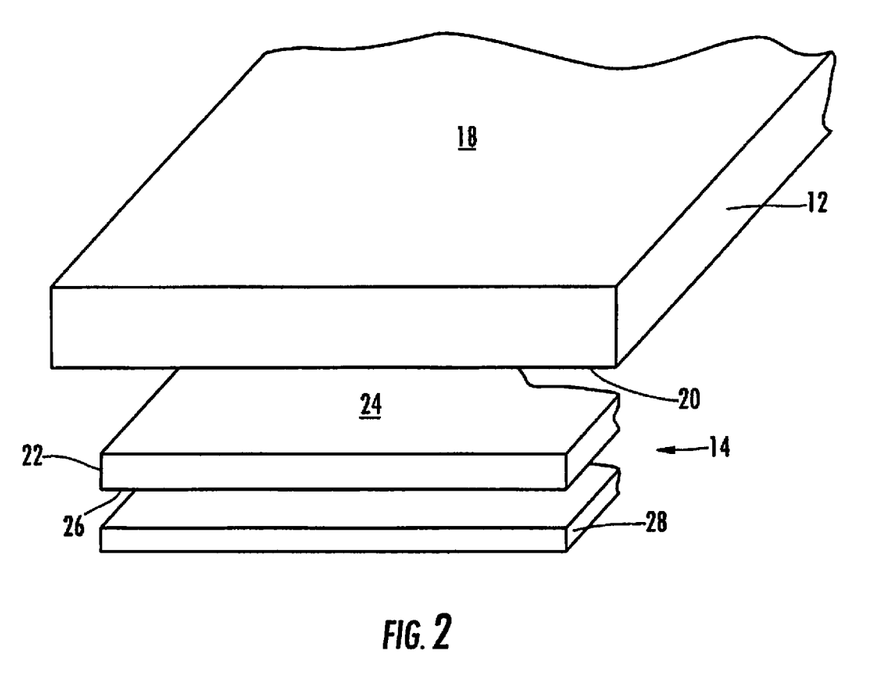
FIG. 2 is an exploded perspective view of a section of the flooring of FIG. 1.

With reference to the drawings, the disclosure relates to a dry adhesive backed flooring 10 that may be readily applied to a subfloor S, such as a concrete slab common to hospital floor structures, and to apparatus and methods for manufacturing and installing the flooring 10. The flooring 10 is provided as a roll on a core C and includes a sheet flooring material 12 married to a double-sided sheet adhesive 14. As described more fully below, the sheet material 12 and the sheet adhesive 14 are married in such a manner that the resulting flooring material 10 is substantially free of bubbles and wrinkles that would show through when the flooring material 10 is installed on the subfloor S.

The sheet flooring material 12 is a vinyl, rubber, or other sheet flooring product provided as a roll 16 (FIG. 3) It will be appreciated that the sheet material 12, and hence the flooring 10, may be provided in virtually any width, thickness, and length common to rolled sheet flooring. However, especially for hospital applications, the sheet material 12 is provided in widths of from about 4 to about 7 feet and in lengths of up to about 100 feet. The sheet flooring material 12 has an upper decorative surface 18 opposite an underside surface 20. Conventionally, the underside surface 20 is somewhat roughened for better suitability with wet adhesives, such as latex adhesives, conventionally used to apply sheet flooring to a subfloor. It has been observed that the sheet material 12 for use in accordance with the disclosure may have the underside surface 20 roughened, as is conventional, or the underside surface 20 may be smooth.

The double-sided sheet adhesive 14 is provided as a roll (FIG. 3) and includes a scrim 22 having opposite adhesive surfaces 24 and 26. The sheet adhesive 14 is provided on a roll having a length at least the length of the roll of the flooring material 12 to which it is to be applied. The lower adhesive surface 26 is covered by a release liner 28. Accordingly, when in its roll form, the adhesive 14 is rolled so that the release liner 28 provides the outermost surface of the roll and the adhesive surface 24 faces the release liner 28. A preferred double-sided sheet adhesive is a double-sided polyacrylic adhesive sheet material having a polyethylene terephthalate (PETP) scrim coated on both sides with a thin and uniform layer of a polyacrylic-based transfer adhesive and covered on one side by a silicon coated paper release liner. The scrim 22 has a thickness of about 130 microns (5.12 mils) and the adhesive surfaces are applied in an amount of about 0.0029 to about 0.0053 ounces per square inch.

The width of the roll of the sheet adhesive 14 substantially corresponds to the width of the roll of the flooring material 12, preferably being slightly less such that the adhesive 14 does not extend beyond the side edges of the flooring material 12. For example, for a roll of the flooring material 12 having a width of 6 feet (70 inches), the sheet adhesive 14 preferably has a width of about 69.5 inches, with the sheet adhesive 14 centered relative to the flooring material 12 to leave a space of about 0.25 inches between the edge of the sheet adhesive 14 and the edge of the flooring material 12.

It has unexpectedly been discovered that application of a scrim reinforced polyacrylic adhesive to vinyl or rubber flooring products according to the disclosure yields a bond between the sheet adhesive and the flooring and a bond between the subfloor and the sheet adhesive that substantially permanently maintains the flooring adhered to the subfloor, even when subjected to wet conditions. In this regard, the terminology "substantially permanently maintains" will be understood to mean that the flooring remains substantially flat as initially applied and does not significantly rise from the subfloor, bubble or otherwise detach from the subfloor under normal use conditions for the flooring. Normal use conditions means use conditions of the flooring common to the environment, such as rolling a bed thereon, walking upon, and the like, as to be distinguished from acts specifically designed to remove flooring, such as pulling upwardly thereon with substantial force. In addition, it has been unexpectedly observed that the flooring 10 may in fact be applied to a wet concrete subfloor and that the sheet adhesive 14 thereof substantially permanently maintains the flooring adjacent the subfloor. Accordingly, the flooring 10 has been observed to be particularly suitable for application in environments that experience wet conditions, such as in basements, wash rooms and the like.

Without being bound by theory, it is believed that the scrim reinforced polyacrylic sheet adhesive 14 creates a barrier that resists water in the concrete subfloor S from penetrating therethrough, and it has been observed that the scrim reinforced polyacrylic sheet adhesive 14 substantially inhibits drawing or wicking of water. It is further believed that use of the sheet adhesive 14 to bond vinyl and rubber flooring or the like to concrete or other subfloor materials requires two bonds: one to the underside of the flooring material and one to the subfloor. In this regard, manufacture of the flooring 10 as described herein allows for the bond of the adhesive to the flooring material to take place in a controlled environment and in a precise manner that avoids the formation of bubbles and wrinkles in the flooring material 10 that would show through when the flooring 10 is installed on the subfloor S.

In brief overview of the manufacture of the flooring 10, it has been discovered that marriage of the flooring material 12 and the sheet adhesive 14 in roll form requires attention to several key factors. For example, it has been observed that it is very difficult to marry the flooring material 12 and the sheet adhesive 14 while avoiding bubbles and wrinkles that would show through when applied or installed on the flooring 10. Vinyl and rubber sheet flooring products come from several different manufactures with varying compositions and widths, all of which become factors in successful application. With some materials temperature during application can also be a factor. Certain materials require to be rolled surface face out and others face in.

For example, for softer compositions, width guides provided on the apparatus for the flooring material are pinched in until the material is slightly bowed (crimped between the guides until it rises off the table). It has been discovered that this is advantageous so that when the tension from the winding application is in effect, the material shrinks to fit in the guides. With regard to temperature, the ambient temperature typically changes the flexibility of the flooring material 12. Cold makes the material stiffer, and warmer weather makes the material more pliable and slower processing speeds may be indicated for the colder materials. However, it is desirable to provide a manufacturing environment having a substantially uniform temperature year-round to minimize any temperature related effects. With regard to orientation, it is desirable to use of flooring materials with a relatively soft wear layer face out. Everything else is typically wound face in. Softness may be determined by depressing a thumbnail or small blunt tool into the surface of the material. If it leaves and indentation that does not go away in a few seconds, it is considered soft and is rolled face out to protect the material.

It has been discovered that a preferred point to accomplish marriage of the sheet adhesive 14 to the flooring material 12 is right as it is being rolled up onto the core C to result in the flooring 10 being substantially free of bubbles and wrinkles that would show through when the flooring material 10 is installed on the subfloor S. In addition, the flooring material 12 and the sheet adhesive 14 must be maintained at a desired angle so they consistently meet right at the marriage point. Also, having the sheet material 14 in a desired thickness and width is necessary to provide proper coverage to the edges without allowing bleedthrough at the seams of the flooring during installation. Also, substantially even tension must be applied to the roll of the sheet adhesive as it unwinds to keep it running straight and wrinkle-free.

Figure 3:
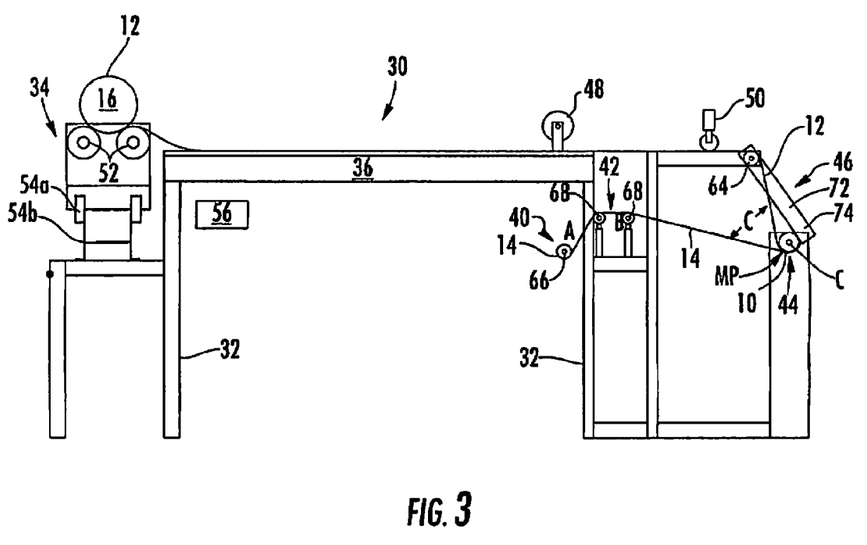
FIG. 3 is a side view of apparatus according to the disclosure for manufacturing the flooring of FIG. 1.
Figure 4:
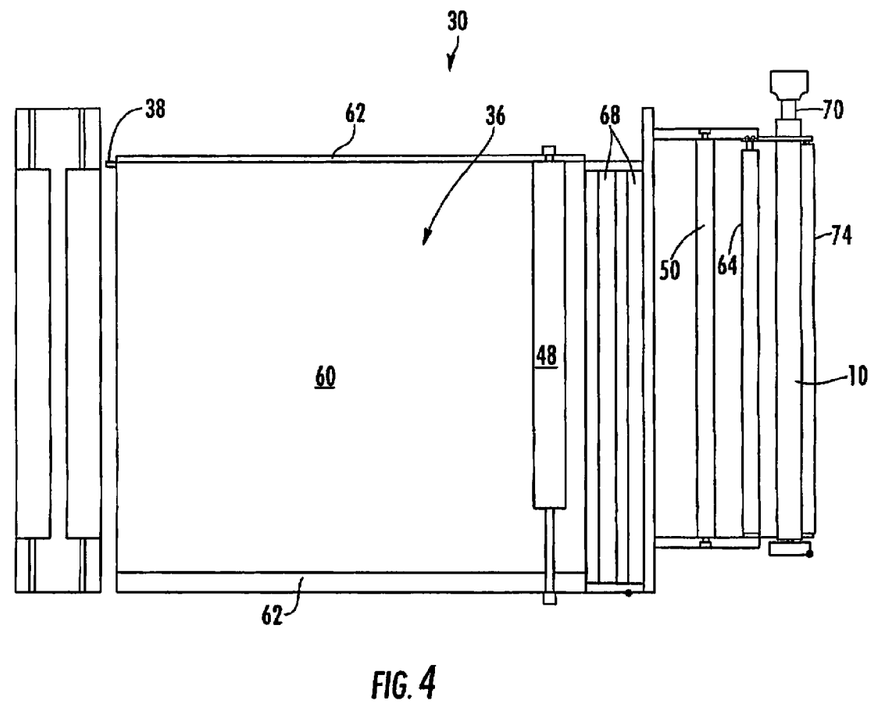
FIG. 4 is a top plan view of the apparatus of FIG. 3.

With reference now to FIGS. 3 and 4, there is shown a schematic of an apparatus 30 configured to desirably marry the sheet adhesive 14 with the flooring material 12 to yield the flooring 10 so that it is substantially free of bubbles and wrinkles that would show through when the flooring material 10 is installed on the subfloor S.

The marriage apparatus 30 includes a frame 32 onto which is located a flooring material support 34, a table 36, a flooring material position indicator 38, a sheet adhesive support 40, a sheet adhesive tensioning system 42, a flooring support 44, and a weight system 46 for bearing against the flooring support 44. The apparatus 30 may further include a weighted roller 48 and a lateral adjustment roller 50.

The apparatus 30 is configured to provide the flooring 10 in a rolled orientation with the decorative surface 18 facing inward. This is desirable to protect the decorative surface 18. However, as described below in connection with FIG. 5, apparatus may be configured to provide the flooring 10 in a rolled orientation with the decorative surface 18 facing outward.

The frame 32 provides a sturdy support for mounting and positioning the various components of the apparatus 30, and may be provided as by welded steel construction. The flooring material support 34 is located at a first end of the frame 32 and includes a pair of support rollers 52 onto which the roll 16 of the sheet flooring material 12 is placed, with the material 12 unrolling from the bottom of the roll 16 with the roll 16 rotating counterclockwise on the support rollers 52. The support rollers 52 are mounted on a lateral positioning system 54 that is movable laterally, e.g., left or right, relative to the frame 32 and the table 36 on the frame 32. Movement of the lateral positioning system 54 is controlled as by a computer controller 56 associated with the positioning system 54 in response to feedback from the flooring material position indicator 38. The controller 56 may communicate with the positioning system 54 and the position indicator 38 as by wire or wireless interface. The lateral positioning system 54 may be provided as by an electrically powered wheeled member 54a laterally movable on a track 54b as by an electric drive motor controlled by the computer controller 56.

The table 34 provides a large flat surface across which the flooring material 12 is extended to enable the width of the flooring material 12 to be aligned with the sheet adhesive 14. In this regard, the table 34 includes a flat surface 60 along the longitudinal sides is disposed a pair of width guides 62. The table 34 includes a roller 64 located at the distal end of the table 34 so as to enable the flooring material 12 to be directed from the table 34 to the flooring support 44 at a desired angle. In this regard, as explained below, it has been discovered that a desired angle of the flooring material 12 relative to the sheet adhesive 14 is desired to enable satisfactory marriage of the flooring material 12 and the sheet adhesive 14 to provide the flooring 10. The weighted roller 48 may be provided above the table 30 if desired to be positioned to bear against the flooring material 12 if needed to maintain tension in the material 12, such as when the material 12 is substantially at the end of the roll.

The flooring material position indicator 38 may be provided as by an electrical eye or other sensor suitable for detecting the location of the edge of the flooring material 12 relative to one of the guides 62 and for providing corresponding signals to the computer controller 56 for comparing the location of the edge of the flooring material 12 to a predetermined threshold. If the location of the edge of the flooring material 12 exceeds the threshold, information in this regard from the indicator 38 is utilized by the computer controller 56 to generate a signal to the lateral positioning system 54 that results in the positioning system 54 adjusting the position of the flooring material 14 so that the edge thereof is returned to a location within the predetermined threshold. For example, the wheeled member 54a will move along the track 54a in a desired direction and a desired amount to reposition the support rollers 52, and hence the roll 16 of the flooring material 14, a desired amount. The position indicator 38 preferably updates the location information substantially continuously.

The lateral adjustment roller 50 may also be utilized in conjunction with the position indicator 38 to adjust the location of the edge of the flooring material 12. For example, the roller 50 is located adjacent the distal end of the table 32 and may be configured to enable application of non-uniform pressure onto the material 12 to urge the material so that it moves laterally one way or the other. The roller 50 may be computer controlled utilizing information from the position indicator 38 in the manner of the positioning system 54.

The sheet adhesive support 40 is provided as by an air expandable bladder shaft 66 configured to rotatably receive and to expand to snugly engage the roll of the sheet adhesive material 14 as it unrolls. The sheet adhesive support 40 is located downline from the flooring material support 34, and upline from the flooring support 44. The sheet adhesive tensioning system 42 is provided as by a pair of laterally spaced bars 68 over which the sheet adhesive 14 is passed.

The bars 68 are independently and vertically adjustable relative to the support 40 and are adjusted to positions to maintain a substantially uniform and desired tension on the sheet adhesive 14 as it is unrolled during the manufacture of the flooring 10.

The flooring support 44 is provided as by a power driven and air expandable bladder shaft 70 configured to rotatably receive and to expand to snugly engage the core C onto which the flooring represented by the married flooring material sheet 12 and the sheet adhesive 14, is rolled to provide the finished flooring material 10. The flooring support 44 is located downline of the sheet adhesive support 40. The shaft 70 may be rotated at a desired speed as by an electrical motor.

The weight system 46 is configured to bear against the outer surface of the enlarging roll of the flooring 10 as the flooring 10 is manufactured. This is desirable to maintain a desirably tight winding of the roll of the flooring 10. The weight system 46 may include a steel bar 72 pivotally mounted to the frame 32 adjacent the roller 64 and having a roller 74 located at a distal end thereof for engaging the roll of the flooring 10.

As shown in FIG. 3, the apparatus 30 is configured so that the flooring material 12 unrolls from the roll 16 and onto the table 32 to a substantially flat orientation, extending in this manner to the roller 64. The flooring material 12 curves over the roller 64 and downward to the core C mounted on the shaft 70 of the flooring support 44. The sheet adhesive 14 unrolls from a location in-between the roll 16 and the core c, and passes over the sheet adhesive tensioning system 42 and to the core C. In this regard, it has been observed to be beneficial to maintaining tension of the sheet adhesive 14 to maintain the angle of the sheet 14 approaching the tensioning system 42 at an angle A of from about 30 to about 60 degrees, and maintaining the angle between the leading and the trailing one of the rollers 62 at an angle B of from about 0 to about −20 degrees.

The confluence of the flooring material 12 and the sheet adhesive 14 at the core C provides a marriage point MP of the flooring material 12 and the sheet adhesive 14. The marriage point MP is defined substantially at the core C, it being understood that the marriage point MP, while initially at the core C, will radially migrate from the core C corresponding to the thickness of the roll of the flooring 10 as the roll of the flooring 10 enlarges. In this regard, it has been observed that it is advantageous to maintain the angle between the flooring material 12 and the sheet adhesive 14 approaching the marriage point MP at an angle C of from about 65 degrees to about 85 degrees, most preferably about 78 degrees.

In operation of the apparatus 30 to marry the flooring material 12 and the sheet adhesive 14 to provide the flooring 10, the flooring material 12 and the sheet adhesive 14 are each located on the apparatus 30 as described and initially each secured to the core C located on the powered shaft as by tape or the like. Then, the powered shaft 70 is rotated at a desired rotational speed, initially of about 4 rpm, ramping up to about 25 rpm, until the end of the roll of the flooring material 12 is approached, at which time the speed is slowed. As will be appreciated, the powered shaft 70 serves to appropriately unwind the rolls of the flooring material 12 and the sheet adhesive 14, with the flooring material support 34 and the flooring material position indicator 38 operating as described to maintain the flooring material 12 in alignment with the sheet adhesive 14, and the sheet adhesive tensioning system 42 maintaining desired tension of the sheet adhesive 14. In this manner, the apparatus 30 functions to marry the flooring material 12 and the sheet adhesive 14 (with the underside surface 20 married to the adhesive surface 24) in such a manner that the resulting flooring material 10 is substantially free of bubbles and wrinkles that would show through when the flooring material 10 is installed on the subfloor S.

Figure 5:
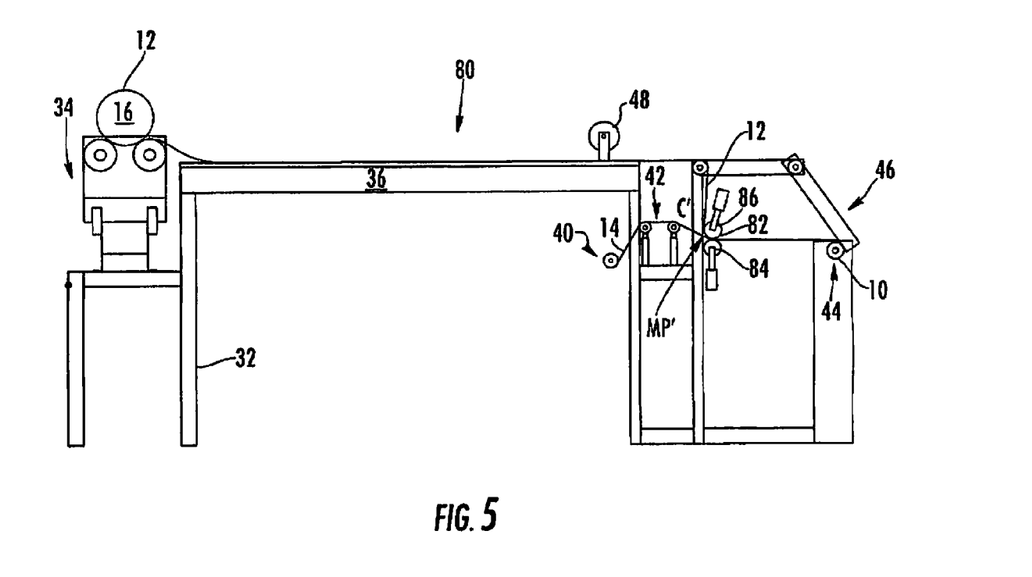
FIG. 5 is a side view of an alternate apparatus according to the disclosure for manufacturing the flooring of FIG. 1

With reference now to FIG. 5, there is shown an apparatus 80 configured for use with the flooring material 12, when it is of a type with a relatively soft wear layer face out, and configured to roll the material 12 face out to protect the material. The apparatus 80 may include the same components as the apparatus 30, such components bearing the same reference numerals as in the apparatus 30, except an additional component in the nature of a nip 82 provided by opposed rollers 84 and 86. In this regard, the nip 82 provides a location for a new marriage point MP', the new location being remote from the core C and closer to the roll of the sheet adhesive 14. It has been observed that a slight decrease of the angle at which the flooring material 12 and the sheet adhesive 14 meet at the new marriage point MP', with an angle C' of from about 60 degrees to about 80 degrees, most preferably about 70 degrees. The apparatus 80 may be operated in substantially the same manner as the apparatus 30 to provide the flooring 10 which is substantially free of bubbles and wrinkles that would show through when the flooring material 10 is installed on the subfloor S.

The flooring 10 according to the disclosure is substantially easier and less time consuming to install as compared to conventional wet adhesive applied rolled flooring. For example, the flooring 10 may be applied as by simply unrolling the flooring 10 over the subfloor S, while removing the release liner 28 so that the adhesive surface 26 faces and overlies the subfloor S. Next, a heavy roller or the like is rolled over the thus installed flooring 10, rendering the flooring 10 in an installed state, with the flooring 10 being immediately available for use, including heavy foot traffic, rolling of a bed or the like, with no further treatment or curing of the adhesive being needed. The subfloor S may even be wet without negatively impacting installation, however, it is preferred that it not have an appreciable dirt, dust, or other loose particulate matter thereon.

Another advantage of the flooring 10 is that the sheet adhesive 14 is substantially free of any volatile organic compounds or the like, such that the area into which the flooring 10 is installed may be immediately occupied. In addition, it has been observed that the flooring 10 has greatly enhanced resistance to bubbling, rising, or the like as is common to conventionally adhered flooring, and due to this, is able to last substantially longer, especially in the hospital environment, where the floor is often exposed to moisture and heavy use as by the rolling of beds thereon. In this regard, the flooring 10 once applied is substantially permanently maintained adjacent the subfloor by the sheet adhesive 14 while avoiding bubbling, rising, and the like. In addition, the installed flooring 10 has an aesthetically pleasing appearance, and is substantially free of bubbles and wrinkles.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method of manufacturing a dry adhesive backed flooring for being installed in a flat orientation on a subfloor, the method comprising the steps of:
   providing a roll of a sheet flooring material provided in a roll, the sheet flooring material having a first length, a first width, a decorative upper surface, and an opposite under surface;
   providing a roll of a double-sided dry sheet adhesive substantially free of volatile organic compounds, the sheet adhesive having a second length substantially corresponding to the first length, a second width slightly less than but substantially corresponding to the first width, and first and second adhesive surfaces, and
   contacting the first adhesive surface to the under surface of the sheet flooring material to marry the sheet flooring material and the sheet adhesive to yield the dry adhesive backed flooring,
   wherein the dry adhesive backed flooring is installable on a subfloor by contacting the second adhesive surface to the subfloor, to yield an installed dry adhesive backed flooring that is substantially free of bubbles and wrinkles and the second adhesive surface of the sheet adhesive will substantially permanently maintain the installed dry adhesive backed flooring adhered to the subfloor such that the installed dry adhesive backed flooring will remain substantially flat as initially installed and not significantly rise from the subfloor, bubble or otherwise detach from the subfloor under normal use conditions for the dry adhesive backed flooring.

2. The method of claim 1, wherein the double-sided sheet adhesive comprises a double-sided polyacrylic adhesive sheet material having a polyethylene terephthalate scrim coated on both sides with a polyacrylic-based adhesive.

3. The method of claim 1, wherein the flooring material comprises vinyl flooring material.

4. A method of manufacturing dry adhesive backed flooring for being installed in a flat orientation on a subfloor, the method comprising the steps of:
   providing a continuous sheet vinyl or rubber flooring material having a first length, a first width, a decorative continuous upper surface, and an opposite continuous under surface; and
   providing a continuous double-sided dry sheet adhesive having a second length substantially corresponding to the first length, a second width slightly less than but substantially corresponding to the first width, and first and second adhesive surfaces,
   contacting the first adhesive surface as a dry sheet to the under surface of the sheet flooring material to marry the double-sided dry sheet adhesive to the sheet flooring material;
   wherein the dry adhesive backed flooring is installable on a subfloor by contacting the second adhesive surface to the subfloor, to yield an installed dry adhesive backed flooring that is substantially free of bubbles and wrinkles and the second adhesive surface of the sheet adhesive will substantially permanently maintain the dry adhesive backed flooring adhered to the subfloor such that the installed dry adhesive backed flooring will remain substantially flat as initially installed and not significantly rise from the subfloor, bubble or otherwise detach from the subfloor under normal use conditions for the dry adhesive backed flooring.

5. The method of claim 4, wherein the double-sided dry sheet adhesive comprises a double-sided polyacrylic adhesive sheet material having a polyethylene terephthalate scrim coated on both sides with a polyacrylic-based adhesive.

\* \* \* \* \*